June 20, 1961  P. N. NELSON  2,989,350
AIR BRAKE SERVICE UNIT
Filed Feb. 28, 1956
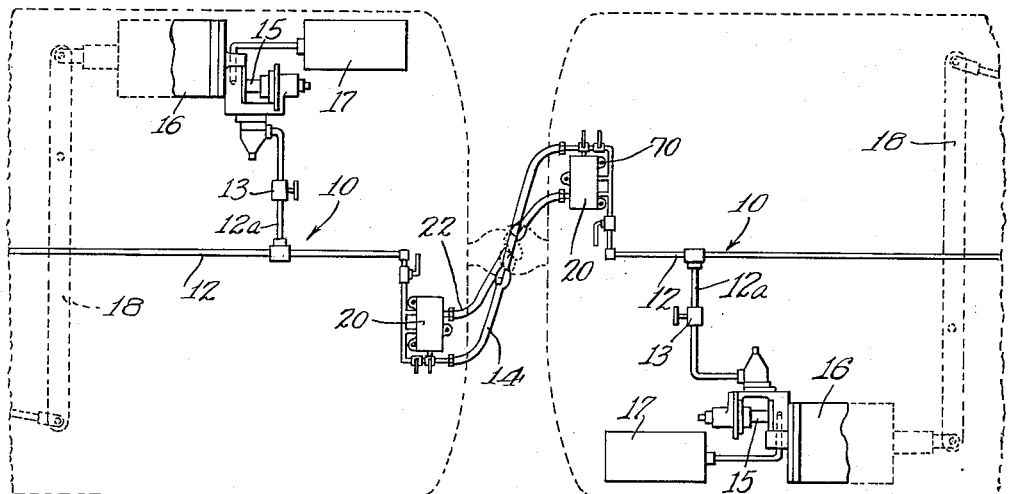
Fig. 1.
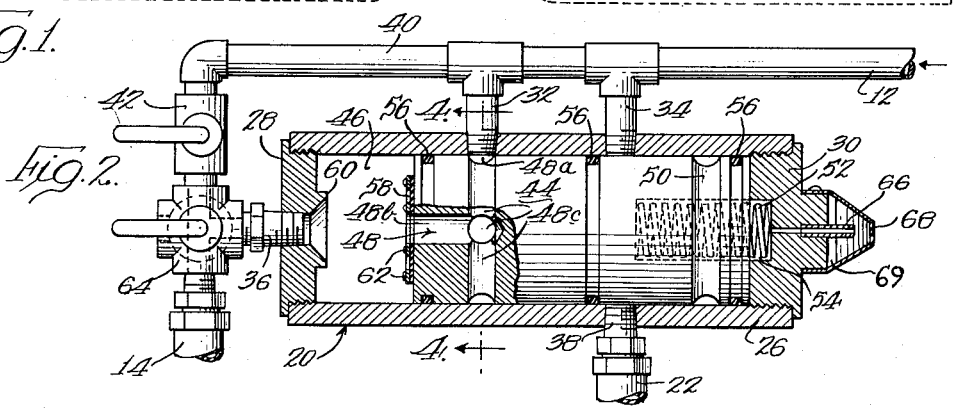
Fig. 2.
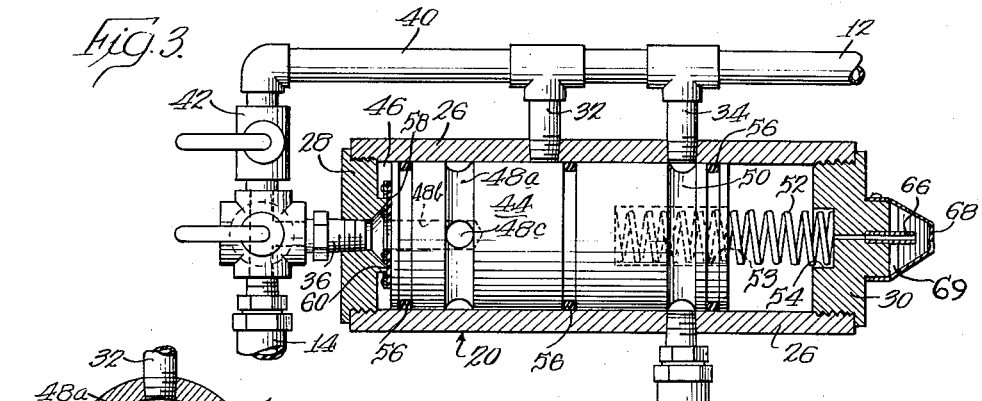
Fig. 3.
Fig. 4.
INVENTOR.
Permil N. Nelson
BY
Attys.

United States Patent Office 2,989,350
Patented June 20, 1961

2,989,350
AIR BRAKE SERVICE UNIT
Permil N. Nelson, Galesburg, Ill., assignor, by mesne assignments, to Board of Trustees of the First Methodist Church of Rock Island, Rock Island, Ill., a corporation of Illinois
Filed Feb. 28, 1956, Ser. No. 568,321
2 Claims. (Cl. 303—86)

The present invention relates to pressure fluid operated brake systems and more particularly to brake systems of the type including an emergency valve device adapted to effect emergency application of the brakes upon a reduction in brake pipe pressure such as occurs upon the bursting of a flexible hose used in the brake pipe between the cars of the train.

It is the general object of the present invention to provide an air brake service unit for use in a pressure fluid operated automatic brake system to keep said system in service in the event of the failure of a flexible hose, thereby eliminating the necessity for an emergency application of the brakes ordinarily required upon such a hose failure.

It is another object of this invention to provide an air brake service unit of the above type which is suitable for use with the automatic air brake systems in use on modern railroad equipment.

It is a further object of this invention to provide an air brake service unit having the above characteristics which is adapted to provide an emergency connection in the pressure fluid brake line in the event of the failure of a flexible brake line hose to enable the train to proceed to the next scheduled stop before making repairs.

It is still another object of this invention to provide an air brake service unit of the foregoing character which is adapted to be manually actuated to connect the flexible stand-by hose in the brake system when it is necessary to replace defective or otherwise damaged main flexible conduits without interrupting the air brake service to the train.

Still a further object of the present invention is to provide an air brake service unit of the type set forth above which is quick-acting upon a predetermined reduction in fluid pressure in the brake pipe caused by the failure of a flexible hose to prevent the loss of pressure fluid from the brake pipe, which loss would result in an emergency application of the brakes throughout the train.

It is still a further object of the invention to provide a novel air brake service unit having the characteristics described above which is inherently reliable and which is adapted for use under severe service conditions with a minimum of maintenance while giving instantaneous and dependable service.

Other objects and advantages will become apparent as the following description proceeds, taken in connection with the accompanying drawing wherein:

FIGURE 1 is a diagrammatic representation of a pair of coupled railroad cars having a brake system including devices embodying the present invention.

FIG. 2 is a plan view, partly in section, of the service unit, embodying the present invention, in a normal operative position.

FIG. 3 is a view of the service unit in the stand-by or emergency position.

FIG. 4 is a section view taken substantially in the plane of line 4—4 of FIG. 2.

While the invention is susceptible of various modifications and alternative constructions, a certain illustrative air brake service unit has been shown in the drawing and will be described below in detail. It should be understood, however, that there is no intention to limit the invention to the specific form disclosed, but, on the contrary, the intention is to cover all modifications, alternative constructions, and equivalents falling within the spirit and scope of the invention as expressed in the appended claims.

The air brakes employed on modern, high-speed trains include the use of appropriate braking means which are operated by a pressure fluid actuated brake cylinder. The brake cylinder on each car is, in turn, supplied with air from an auxiliary reservoir on the car. This air supply is controlled by a control valve which operates in response to increases or decreases in pressure in the train brake pipe. In order to obtain rapid and dependable braking action, passenger trains in particular are equipped with two separate brake pipe systems, namely a straight-air system and an automatic system. In the straight-air system, the car brakes are applied in response to an increase in pressure in the straight-air brake line. On the other hand, in the automatic system the brakes are applied in response to a decrease in pressure in a normally charged brake pipe which is separate from, but parallel to, the straight-air brake pipe. Suitable control valves are provided so that the two systems work together. The automatic system, however, is particularly designed to override the straight-air system in the event of an emergency such as would arise in the event of a failure of a flexible hose. For this reason, the novel service unit described herein finds particular but not exclusive utility in the automatic component of an air brake system.

Referring to FIGURE 1, which is a diagrammatic illustration of the automatic brake system component, it can be seen that the system includes a normally charged brake line 10 which runs the length of the train. This brake line comprises, among other things a brake pipe 12 on each car connected to the brake pipes on adjoining cars by means of a flexible hose 14. The brake cylinder 16 along with its connected brake system gear 18 is shown diagrammatically in FIGURE 1. The brake cylinder 16 is charged and operated through a conventional air system providing an air supply line 12a, including a cut out valve 13, this line 12a receiving its air from the brake pipe line 12 and communicating with a triple valve 15 having one connection leading to the auxiliary reservoir 17 of the car and also having operative connection with the brake cylinder 16 of said car. The engineer's control valve (not shown) is located in the cab of the engine and is provided with the numerous control positions usually present in brake systems of this type. With this valve the engineer has complete control of the brake system during the operation of the train, and can apply the brakes to make normal service stops, or in cases of emergency, can make an emergency application of the brakes.

By way of introduction to a description of the novel service unit described herein, it may be helpful to consider the basic principle on which automatic component of modern air brake systems operate. Briefly, if, after the system is charged with a pressure fluid, such as compressed air, a reduction is made or occurs in the brake pipe pressure, the brake will be applied. Therefore, the brake pipe pressure muse be restored in order to release the brake. It follows that if any accident occurs to the braking apparatus which reduces the pressure in the brake pipe, such as the bursting of a flexible hose, the brakes will at once be applied. In this respect such systems are automatic and do not require the action of any members of the train crew upon such a failure of the flexible hose or a parting of the train to apply the emergency brakes. The systems presently in use comprise, however, many more complicated features and components in order to provide a reliable and quick-acting brake system. All of these systems, no matter how complex, still rely on the basic principle described above, namely, that upon a reduction of pressure in the brake pipe, the brakes are applied.

When a train is traveling at a relatively high speed, failure of one of the flexible brake pipe coupling conduits will cause the application of the emergency brake with the undesirable result of locking the wheels so that they slide along the track. This sliding causes flat surfaces to appear on the wheel rims and necessitates the regrinding or replacement thereof.

In keeping with the objectives set forth above, a novel service unit 20 has been provided which includes a flexible stand-by hose and an associated control unit adapted, upon damage to, or bursting of the main flexible brake pipe hose and resulting decrease in pressure in the brake pipe to connect the stand-by conduit into the brake pipe line.

The novel service unit 20 comprises in detail a cylinder or housing 26 closed at its end by suitable end plates 28 and 30. For purposes of admitting pressure fluid to the cylinder, a pair of axially spaced inlet members 32 and 34 are provided which are normally in communication with the car brake pipe 12. A main outlet passage 36 is provided in one end plate 28 of the cylinder 20, the passage 36 communicating with the main flexible hose coupling 14. A second or stand-by outlet passage 38 is provided in the cylinder 26 and in substantially the same plane with the stand-by inlet 34. The stand-by outlet communicates directly with the flexible stand-by hose 22 through a suitable connection.

Provision is made for bypassing the service unit 20 completely. This is accomplished by means of a branch pipe 40 leading directly from the brake pipe 12 to the main outlet passage 36 of the cylinder 26 and the main flexible hose 14. During normal operation this branch pipe is closed by a stopcock 42.

In order to distribute the pressure fluid to either the main inlet and outlet passages, 32 and 36 respectively, or the stand-by inlet and outlet passages, 34 and 38 respectively, a distribution spool or piston 44 is slidably positioned in the cylinder 26 and is adapted for movement between either of two extreme positions.

In its normal operating position, the piston 44 is at the extreme rear end, or right-hand end as shown in FIG. 2, of the housing 26. The piston 44 is held in this position by the fluid pressure in the chamber 46 which is between the end of the piston 44 and the outlet end of the cylinder 26. When the piston is in the above described position, the brake pipe 12 communicates with the main flexible hose 14 through the forward cylinder inlet passage 32 and a series of passages 48 in the end of the piston 44 which communicate with cylinder chamber 46. The chamber 46 in the end of the cylinder 26 discharges into or communicates through the outlet passage means 36 for communication with the main flexible air hose 14 when the valve 44 is being held to the right as shown in FIG. 2.

Referring more specifically to FIG. 4, it can be seen that the passages 48 through the piston 44 comprise generally an annular groove 48a communicating with an axial bore 48b through a series of radial passages 48c.

When the piston is in the alternative or stand-by position, the pressure fluid inlet 34 from the brake pipe 12 communicates with the diametrically opposed pressure fluid outlet 38 and the flexible stand-by hose 22 by means of a peripheral groove 50 in the end of the piston 44 remote from the main fluid pressure passages 48.

Means are provided for positively biasing the piston toward its stand-by position. One such means is a spring 52 seated in retaining recesses 53 and 54 in the piston 44 and cylinder end plate 30 respectively. As long as there is sufficient pressure in the chamber the piston will remain in its cocked or main line position. The piston is normally held in a position in which the brake pipe 12 communicates with the main flexible coupling 14. This position is obtained by means of fluid pressure in the cylinder chamber 46 acting on the front face of the piston 44. The strength of the spring 52 is sufficient to quickly urge the piston forward to the stand-by position upon a predetermined reduction in pressure in the chamber 46. Means for adjusting the spring force can be provided, although for most applications a single strength spring is desirable to avoid the possibility of tampering with or altering the operational characteristics of the service unit. Assume, for example, that the normal pressure in the brake pipe, and thus in the service unit chamber, is 70 p.s.i. and that a pressure drop of 35 p.s.i. in the brake pipe will cause an emergency application of the brakes. The service unit 20 is then set to operate in response to a similar pressure drop of 40 to 50 p.s.i. in its immediate vicinity, such as would be the resulting pressure drop when an adjacent flexible hose bursts. The quick action of the service unit and the frictional resistance to fluid flow in the brake pipe itself would prevent the service units on other cars from shifting. When the train is running at high speeds and a hose breaks, the wheels will not slide even if the emergency brakes are applied. The danger of wheel sliding comes only when the emergency brakes on the entire train are continuously applied as the speed of the train is reduced. For this reason, it should be understood that, while the emergency brakes will be applied momentarily in the event of a broken hose, the quick action of the service unit will allow the brake pipe fluid pressure to build up again to a level sufficient to cause the release of the brakes.

It can thus be seen that by carefully determining the strength of the spring 52, the service unit can be set to operate in response to any desired pressure drop in the adjacent brake pipe.

In order to prevent the leakage of pressure fluid between the various inlet and outlet passages, a plurality of O-ring seals 56 are provided in the outer peripheral surface of the piston 44. These seals 56 are positioned, as shown in FIG. 2, in relation to the various cylinder passages so that they do not cross the inlet and outlet passage openings in the cylinder wall to prevent them from being damaged.

In order to obtain relatively quick action of the piston upon the predetermined pressure drop, it is designed so that a small axial movement thereof closes the pressure fluid inlet passages 32 and 34 from the brake pipe 12. This prevents the introduction of additional pressure fluid into the chamber 45 which would result in a resisting force against the action of the spring 52.

When the piston 44 is in the stand-by position, as shown in FIG. 3, leakage of pressure fluid into the chamber 46 between the end of the piston and the end wall of the cylinder is prevented by means of an annular gasket 58 on the end of the piston adapted to abut against a projection 60 in the end wall 28 of the cylinder 26. The gasket is held to the end of the piston by means of suitable annular rings 62.

In case a flexible hose bursts while the train is in motion, the stand-by hose will be employed until the train makes a stop for repairs. At that time, the main flexible hose 14 is replaced and the service unit is reset by opening the stopcock 42 to allow substantially full brake pipe pressure to enter the outlet passage 36 and act against the end of the piston to force the piston 44 to its cocked position.

Under certain circumstances, for example, where the flexible hose 14 has developed a weak spot, it is desirable to replace that hose. This can be done without disturbing the fluid pressure in the brake pipe 12 by means of a three-way valve 64 in the outlet line 36 leading to the flexible coupling 14. In order to discharge the pressure fluid from the weak hose and thereby relieve the pressure in it, this valve is rotated to the position in which the service unit chamber 46 is exhausted to the atmosphere, thereby connecting the stand-by hose 22 with the brake pipe. After the hose has been replaced, the three-way valve 64 is returned to its normal position and the service unit is reset as described above. The system is then in operating condition for normal use.

In order to prevent the pressure fluid, or compressed air and any other fluids or dirt from being entrapped behind the slidable piston 44, which would result in a failure of the service unit to reset, an exhaust port 66 is provided in the end wall 30 of the cylinder adjacent to spring 52. Water or dirt is prevented from entering the exhaust port 66 by a shield 68 which is secured to the end of the cylinder and is spaced therefrom at its lower edge to form an opening 69 through which water or dirt can fall.

The service unit is adapted to be mounted on the car frame by any suitable means such as flanges 70 or the like as shown for example in FIGURE 1.

A novel and useful service unit has thus been provided for use with the automatic air brake systems presently employed on high-speed trains. A stand-by flexible hose coupling is provided between the cars for use when the main hose coupling bursts or is otherwise damaged, and is also of particular use in situations in which it is necessary to change the main flexible hose coupling without disturbing the operation of the automatic brake system.

I claim as my invention:

1. The combination with a pressure fluid operated automatic train brake system including a normally fluid charged brake pipe of a service unit adapted to connect the brake pipe of a car with the train brake pipe, said service unit comprising a cylinder having first and second pressure inlet ports for the fluid and first and second pressure outlet ports for the fluid, a connection between said car brake pipe and said first fluid inlet port, a second connection between said car brake pipe and said second fluid inlet port, first and second flexible hoses connected with said outlet ports, respectively, and a free piston slidably carried within said cylinder for reciprocation between two positions corresponding to standby and operative cocked positions, said piston having interconnected passageways therein to connect said first inlet port through the body of said piston with the interior of said cylinder for connection with said first outlet port when the piston occupies the operative cocked position, said piston including another passageway therein to connect the second inlet port with said second pressure fluid outlet port when said piston assumes its standby position, resilient means interposed between said cylinder and said piston at one end thereof to urge the piston toward its standby position, said piston being normally held against said resilient means by the fluid pressure within the cylinder between the first inlet and outlet ports, release or drop of the fluid pressure within the cylinder and within the car brake line due to a break or leak in the car brake line permitting said resilient means to function and to actuate the piston toward its standby position establishing a substitute pressure fluid flow through said second inlet and outlet pressure ports.

2. The combination defined and set forth in claim 1, wherein said piston in its actuation between the standby and operative cocked positions functions as a valve means to establish one or the other of said dual fluid flow conditions, and said resilient means comprises a compression spring in said cylinder reacting between the piston and said cylinder at all times, said spring being held under greater reactive force by said piston under fluid pressure within said cylinder during normal operative conditions with piston in its cocked position in the cylinder, said spring force and said cylinder fluid pressure force acting on opposite piston ends.

References Cited in the file of this patent
UNITED STATES PATENTS

| | | |
|---|---|---|
| 810,862 | Hoystatter | Jan. 23, 1906 |
| 852,108 | Daley | Apr. 30, 1907 |
| 2,110,342 | Salvo | Mar. 8, 1938 |
| 2,195,214 | Jacob | Mar. 26, 1940 |
| 2,556,613 | Carter | June 12, 1951 |
| 2,752,939 | Sikora | July 3, 1956 |
| 2,855,247 | Thompson | Oct. 7, 1958 |